May 26, 1931. E. S. IMES 1,807,411
METHOD OF AND APPARATUS FOR TESTING MAGNETIZABLE OBJECTS
Filed June 4, 1925
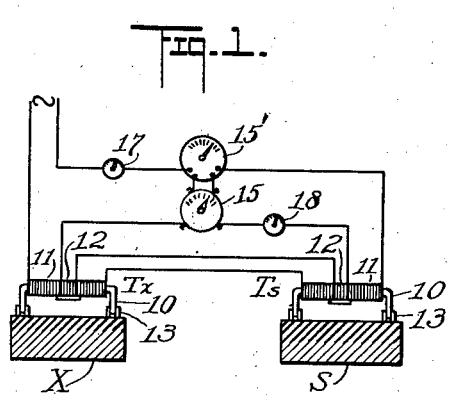
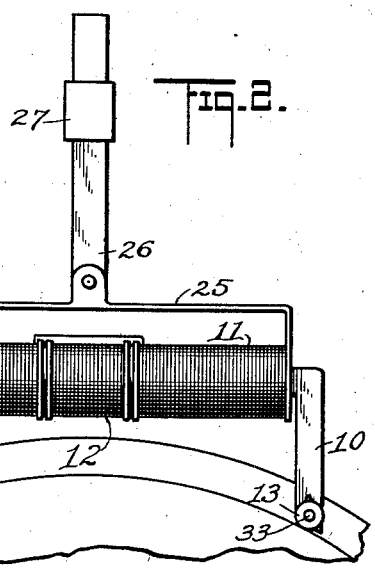
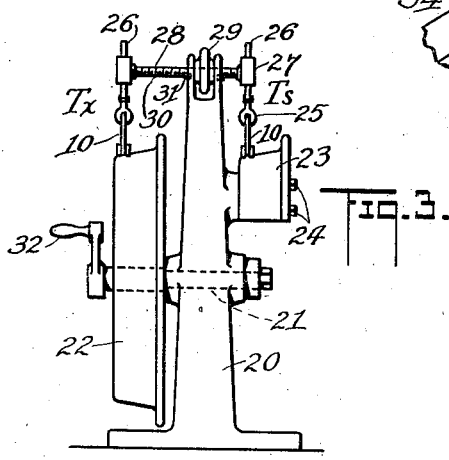
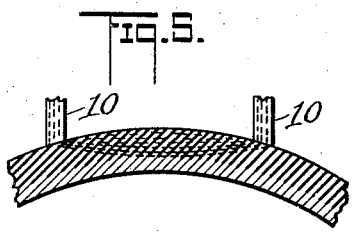
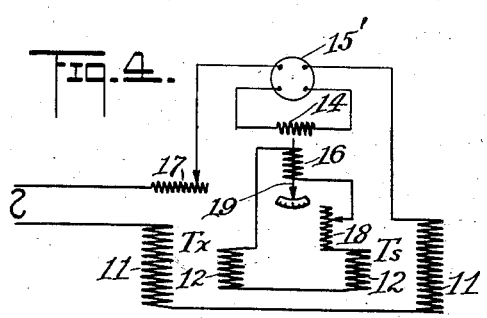
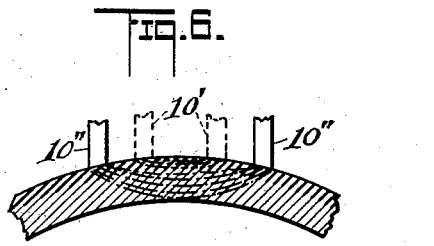
INVENTOR
Elmer S. Imes
BY
ATTORNEY Patented May 26, 1931

1,807,411

UNITED STATES PATENT OFFICE

ELMER S. IMES, OF JERSEY CITY, NEW JERSEY, ASSIGNOR, BY MESNE ASSIGNMENTS, TO MAGNETIC ANALYSIS CORPORATION, OF LONG ISLAND CITY, NEW YORK, A CORPORATION OF NEW YORK

METHOD OF AND APPARATUS FOR TESTING MAGNETIZABLE OBJECTS

Application filed June 4, 1925. Serial No. 34,903.

My invention relates to the testing of magnetizable objects and has for its purpose to provide a method of and apparatus for determining certain physical characteristics of an object by subjecting the object to a magnetic field.

More specifically my invention pertains to specimens that have been subjected to surface treatment, as for instance, chilling, case hardening, surface tempering, surface annealing, etc., whereby the physical characteristics of the surface of the part treated differ from the characteristics of other parts of the object.

It is an object of my invention to provide means for determining the approximate depth to which the surface hardness extends.

Another object of my invention is to provide means for comparing the object to be tested with a standard to determine whether the depth of surface hardness of the object is greater or less than that of the standard.

Other objects of my invention will appear in the following description of my invention as employed in and adapted to certain applications.

In the drawings:

Figure 1 is a largely diagrammatic view, illustrating my testing apparatus employed in comparing a specimen with a standard;

Fig. 2 is an illustration of one of my testing elements designed particularly for application to a curved surface;

Fig. 3 illustrates my testing apparatus as applied to the testing of the tread surface of a car wheel;

Fig. 4 is a diagram illustrating electrical circuits used in my testing apparatus; and Figs. 5 and 6 are fragmentary views of surface treated specimens, illustrating how the magnetic fields produced by my testing apparatus, are affected by variations in the depth of the surface hardness.

Referring to Figure 1, I have shown two objects of a similar composition, one of these, indicated by the letter S, being a standard whose depth of surface hardness has been pre-determined and the other indicated by the letter X being a specimen to be compared with the standard, to determine whether the depth of surface hardness of the specimen is greater or less than or the same as the depth of hardness of the standard. The members X and S are shown in cross section and the depth of surface hardening is indicated by heavier cross hatching.

Two testing elements are employed, the element Ts being applied to the standard and the element Tx to the specimen which is to be tested. The two testing elements are alike and a description of one will apply to both. Each consists of a U-shaped core 10 of soft iron or other suitable magnetic material about which is wound a primary coil 11 and a secondary coil 12. The primary coil is preferably divided into two sections between which the secondary coil is placed. This arrangement, however, is merely one of convenience. The secondary coil could be placed within the primary coil or outside the primary coil, or it might be placed at any other suitable location with respect to the core 10. The two sections of the primary coil are connected in series and virtually form a single winding about the core. The legs of the core are supported upon pairs of rollers 13 composed of non-magnetic material, such as bronze, and the rollers serve to provide an air gap between the ends of the core and the surface upon which the testing element rests. The primary coils of the two testing elements are connected in series with a source of alternating or variable current, not shown. In circuit with the primary coils in the field coil 14 of a dynamometer 15, as shown more clearly in the diagram Fig. 4. The secondary coils of the two testing elements are bucked and are connected in series with the potential coil 16 of the dynamometer. The maximum strength of the energizing current passing through the primary coils may be varied by a rheostat 17 and the maximum strength of the current passing through the potential coil 16 may be varied by means of a rheostat 18. A phase shifter 15' permits of adjusting the relative phase angle of current passing through coils 14 and 16.

In operation the testing element Ts is placed upon that part of the standard S which has been previously determined to have the desired depth of surface hardness.

Thereupon the element Tx is moved over the specimen to be tested. As the primary coils 11 of the two testing elements are energized with the same current, the same magnetic field will be generated in the cores 10 of the two testing elements, except as said field is affected by variation between the specimen and the standard. If the specimen and the standard are exactly alike, the dynamometer 15 will show no variation between the two, because the secondary coils 12 are bucked and current induced in one coil will be opposed by the equal current induced in the other coil. If, however, the specimen varies from the standard the variation will be indicated by the dynamometer, and the needle 19 of the dynamometer will show by the direction in which it moves, the nature of the variation, and by the amplitude of its movement the extent of the variation. The nature of the variations and the manner in which the apparatus shows depth of surface hardness will be explained below.

The testing element shown in Fig. 2 is very similar to those shown in Fig. 1, the principal difference lying in the fact that the legs on the core 10 are shaped at their ends to conform to a curved surface. An illustration of the application of my testing apparatus to a curved surface, is shown in Fig. 3, which illustrates an apparatus designed to test depth of chill or temper of the tread of a car wheel against a standard tread surface.

In Fig. 3, the numeral 20 is used to indicate a pedestal in which is journalled a shaft 21. Upon the shaft is mounted a car wheel 22 which is to be tested. At the opposite side of the pedestal there is a standard 23 which may be an entire car wheel or only a portion of a car wheel, as shown. The standard 23 is supported on a bracket carried by the pedestal 20 and is secured thereto by means of bolts 24. Two testing elements are provided, the element Tx bearing upon car wheel 22 and the element Ts upon the standard 23. These elements, as shown in Fig. 2, are each supported in a yoke 25 pivoted to a vertical bar 26. The two bars are adapted to slide in guides or sleeves 27 which are affixed to a threaded shaft 28. The shaft 28 engages the threaded bore of a wheel 29 mounted in the upper end of the pedestal 20, so that by turning the wheel 29, the holders 27 may be moved in a direction parallel to the axis of the wheel 22. To prevent the shaft 28 from turning with the wheel 29, it is formed with a keyway or spline 30 adapted to engage a feather 31 secured to the pedestal 20. A handle 32 is provided on the shaft 21 to permit of revolving the shaft and the wheel 22 mounted thereon, so that the entire circumference of the tread surface of the wheel 22 will be traversed by the testing element Tx, and by operating the wheel 29 at the same time that the handle 32 is operated there will be a relative spiral movement of the testing element Ts with respect to the tread of wheel 22, whereby every part of the tread surface will be subjected to magnetic inspection by the testing element Tx.

It is well known that the density of a magnetic field is determined not only by the current employed to generate the field, but also by the quality of the material traversed by the field. By varying the energizing current by means of resistance or rheostat 17, the depth of penetration of the magnetic field may be varied. As the current is increased, the main body of the magnetic flux will penetrate deeper into the specimen and as the flux emerges from a hardened portion into a softer portion there will be an increased density in the field which will be immediately registered by the dynamometer. The depth of penetration, particularly in the case of a curved surface, will depend to a certain extent upon the span of the legs of the U-shaped cores 10. The greater the span, the deeper the segment included between the core legs will be, and hence the greater will be the depth of penetration of the body of the magnetic flux. This is illustrated in Fig. 6, in which the legs 10' of a testing element cover a narrow span and the lines of force produced are confined almost entirely to the chilled portion of the curved surface of the specimen, whereas another testing element of a wider span, indicated by the numeral 10'', produces a field which passes through the chilled portion of the surface and is confined largely to the softer metal below. Therefore, in setting my apparatus for test, it is important that the depth of chill of the standard be definitely ascertained in advance and that the span of the testing elements be regulated and the strength of the energizing current adjusted to confine the field of force largely to the chilled portion of the wheel. If the chill is deep, in the object under test, the magnetic lines of force will be confined largely to the chilled portion, whereas if the chill is shallow, as indicated in Fig. 6, the magnetic flux will follow the path of least resistance, penetrating through the chilled portion and running almost entirely through the softer metal below. Consequently, if the section shown in Fig. 5 represented a standard and that shown in Fig. 6 a specimen to be compared with said standard, a wide variation would be indicated between the two. A heavier current would flow through the secondary of element Tx than through the secondary of element Ts and the dynamometer needle would be deflected in one direction, indicating that the depth of chill of the specimen was not as great as that of the standard. If, however, the section shown in Fig. 6 were chosen as standard and the section shown in Fig. 5 were tested against the standard, a lighter secondary current would be generated in the element T$x$ than in element T$s$ and the dynamometer needle would be deflected in the opposite direction indicating a deeper chill than standard.

In testing apparatus of this class it is of importance to provide against variations in air gap between the cores 10 and the surface under test; for slight variations of gap will produce marked variations in the density of the field traversing the testing element. If the ends of the cores 10 were to rest directly upon the surface of the specimen any slight variation in the surface over which the cores 10 passed would produce an indication on the dynamometer which could not be distinguished from variations due to physical characteristics of the specimen. However, by providing an air gap of substantial depth between the ends of the cores 10 and the surface under test, slight variations in the regularity of the surface would not vary appreciably the size of the air gap and consequently, the influence of such variations upon the dynamometer would be negligible as compared with that of variations in depth of surface hardness. The sensitivity of the apparatus can be varied by means of the rheostat 18 so that only material fluctuations in the density of the magnetic field would be indicated by the dynamometer. The rollers 13 are mounted on axles 33 which fit tightly in slots 34 in the ends of the cores 10. By moving axles 33 in said slots the rollers 13 may be adjusted to provide an air gap of desirable dimensions between the ends of the cores 10 and the surface under test.

In Fig. 1 I describe the testing element T$s$ as stationary during the test of a specimen, but where variations in depth of surface hardness are normally to be expected due to irregularities of cross-section or other reasons, it is important that the element T$s$ move across the face of the standard at the same rate and in correspondence with the movement of the element T$x$ across the surface of the specimen under test. In a car wheel the depth of chill of the tread surface near the flange of a car wheel normally would be different from that near the opposite edge of the tread. Consequently, in order to be sure that the specimen corresponds with the standard, the two testing elements always occupy corresponding positions transversely on the specimen and the standard. The transverse contour of a tread surface of a car wheel is not normally a straight line, hence the elements T$x$ and T$s$ are permitted to rest by gravity on the specimen and the standard so as to adapt themselves to irregular contours so that there will be no variation of the air gaps between them and the two surfaces. Thus, at the same time slight variations in the diameter of car wheels are also taken care of, while to allow for slight eccentricities in various car wheels, the testing elements are mounted in yokes pivoted to the sliding bars 26 and are thereby permitted to adapt themselves to the circumference of the surface under test.

I have referred above to the relation between the span of the U-shaped cores and the depth of penetration of magnetic flux in the case of a specimen having a curved surface, but it will be understood that the span has an influence on the depth of penetration of the magnetic flux into a flat surface, as well, although in the latter case the influence is not so marked, and it is a feature of my invention to proportion the span of the testing elements more or less closely to the standard depth of surface hardness chosen, after which a more refined adjustment of the penetration of the magnetic flux be made by varying the energizing current.

The term "surface hardness" as I have used it in this specification is not to be construed as limited to a surface portion that is harder than the main body of the standard or the specimen under test, but is meant to include a surface portion that is softer than the main body, as well as a surface portion that differs from the main body in respect to other physical characteristics.

I claim:

1. A method of determining the depth of the surface portion of an object having body and surface portions that differ as to certain physical characteristics, which consists in generating a varying magnetic field of such values that the main body of magnetic flux will penetrate a standard to a pre-determined depth, subjecting the surface portion of the object to said flux, and observing the resultant modification of said field.

2. A method of determining the depth of the surface portion of an object having body and surface portions that differ as to certain physical characteristics, which consists in generating two varying magnetic fields each having a maximum density of such value that the main body of magnetic flux will penetrate a surface portion of a standard to a pre-determined depth, subjecting said surface portion of the standard to one of said fields and the surface portion of the object to the other of said fields, and observing the relative variation of density of the two fields.

3. The combination as set forth in claim 2, wherein the differential of the variations of density of the two fields is observed.

4. A method of determining the depth of the surface portion of an object having body and surface portions that differ as to certain physical characteristics, which consists in generating two varying magnetic fields, each having a maximum density of such value that the main body of magnetic flux will penetrate a surface portion of a standard to a pre-determined depth, subjecting said surface portion of the standard to one of said fields and the surface portion of the object to the other of said fields, and observing the relative effect produced in two test coils placed respectively in said fields.

5. The combination as set forth in claim 4 wherein the two test coils are bucked and the differential of the effects produced in the two test coils is observed.

6. A method of determining the depth of a surface portion of an object having body and surface portions that differ as to certain physical characteristics, which consists in generating two varying magnetic fields of like value, subjecting a surface portion of a standard to one of said fields and the surface portion of the object to the other of said fields, regulating the maximum intensity of the fields so that the main body of the magnetic flux penetrating the standard will be confined to the surface portion thereof, and observing the relative variations of density of the two fields.

7. The combination as set forth in claim 6 wherein the differential of variations of density of the two fields is observed.

8. A method of determining the depth of the surface portion of an object having body and surface portions that differ as to certain physical characteristics, which consists in generating two varying magnetic fields of like value, subjecting a surface portion of the standard to one of said fields and the surface portion of the object to the other of said fields, regulating the maximum intensity of the fields so that the main body of the magnetic flux penetrating the standard will be confined to a pre-determined depth, and observing the relative effect produced in two test coils placed respectively in said fields.

9. The combination as set forth in claim 8 wherein the test coils are bucked and the differential of the effects produced in the two test coils is observed.

10. A method of determining the depth of the surface portion of an object having body and surface portions that differ as to certain physical characteristics, which consists in generating two varying magnetic fields of like value, subjecting a surface portion of a standard to one of said fields and the surface portion of the object to the other of said fields, regulating the maximum intensity of the fields so that the main body of magnetic flux penetrating the standard will be confined to a pre-determined depth, and observing the relative energy absorbed by the standard and the object.

11. The combination as set forth in claim 10 wherein the differential of the energies absorbed respectively by the standard and the object is observed.

12. The combination as set forth in claim 2, with the further step that a relative movement is effected between the magnetic fields and the object, whereby various parts of the object may be compared with the standard.

13. The combination as set forth in claim 2, with the further step that a relative movement is effected between the magnetic fields on the one hand and the object and the standard on the other, whereby various parts of the object are compared with corresponding parts of the standard.

14. The combination as set forth in claim 2, with the further steps that a relative movement is effected between the magnetic fields and the object, and a movement in transverse direction to the aforesaid movement is effected between the fields on the one hand and the object and the standard on the other, whereby all parts of a surface area of the object may be compared with parts of the standard that correspond thereto in said transverse direction.

15. The combination set forth in claim 4, with the further step that relative movement is effected between the magnetic fields and the object whereby various parts of the object may be compared with the standard.

16. The combination set forth in claim 4, with the further step that relative movement is effected between the magnetic fields and the test coils on the one hand, and the object and the standard on the other, whereby various parts of the object are compared with corresponding parts of the standard.

17. The combination as set forth in claim 4, with the further steps that a relative movement is effected between the magnetic fields and the object, and a movement in transverse direction to the aforesaid movement is effected between the fields and test coils on the one hand, and the object and the standard on the other, whereby all parts of a surface area of the object may be compared with parts of the standard that correspond thereto in said transverse direction.

18. The combination as set forth in claim 6, with the further step that relative movement is effected between the magnetic fields and the object whereby various parts of the object may be compared with the standard.

19. The combination as set forth in claim 6, with the further step that relative movement is effected between the magnetic fields on the one hand and the object and standard on the other, whereby various parts of the object are compared with corresponding parts of the standard.

20. The combination as set forth in claim 6, with the further steps, that a relative movement is effected between the magnetic fields and the object, and a movement in transverse direction to the aforesaid movement is effected between the fields on the one hand, and the object and the standard on the other, whereby all parts of a surface area of the object may be compared with parts of the standard that correspond thereto in said transverse direction.

21. The combination set forth in claim 8, with the further step that relative movement is effected between the magnetic fields and the object whereby various parts of the object may be compared with the standard.

22. The combination set forth in claim 8, with the further step that relative movement is effected between the magnetic fields and the test coils on the one hand, and the object and the standard on the other, whereby various parts of the object are compared with corresponding parts of the standard.

23. The combination as set forth in claim 8, with the further steps that a relative movement is effected between the magnetic fields and the object, and a movement in transverse direction to the aforesaid movement is effected between the fields and test coils on the one hand, and the object and the standard on the other, whereby all parts of a surface area of the object may be compared with parts of the standard that correspond thereto in said transverse direction.

24. The combination as set forth in claim 10, with the further step that relative movement is effected between the magnetic fields and the object whereby various parts of the object may be compared with the standard.

25. The combination as set forth in claim 10, with the further step that relative movement is effected between the magnetic fields on the one hand and the object and standard on the other, whereby various parts of the object are compared with corresponding parts of the standard.

26. The combination as set forth in claim 10, with the further steps, that a relative movement is effected between the magnetic fields and the object, and a movement in transverse direction to the aforesaid movement is effected between the fields on the one hand, and the object and the standard on the other, whereby all parts of a surface area of the object may be compared with parts of the standard that correspond thereto in said transverse direction.

27. An apparatus for testing the depth of the surface portion of an object having body and surface portions that differ as to certain physical characteristics, said apparatus comprising like electro-magnets, each having a U-shaped core, one of the magnets being adapted to engage the standard and the other magnet being adapted to engage the object to be tested, the span of the U-shaped cores being proportioned to produce a pre-determined depth of penetration of magnetic flux, and means for observing relative electro-magnetic variations in said magnets.

ELMER S. IMES.